(12) United States Patent
Streicher et al.

(10) Patent No.: US 7,312,593 B1
(45) Date of Patent: Dec. 25, 2007

(54) THERMAL REGULATION OF AC DRIVE

(75) Inventors: John T. Streicher, Hartford, WI (US);
Steven J. Perreault, Sussex, WI (US);
Jeffrey P. Rivard, Hartland, WI (US);
David W. Siegler, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/507,134

(22) Filed: Aug. 21, 2006

(51) Int. Cl.
*H02H 7/08* (2006.01)
*G05D 23/30* (2006.01)

(52) U.S. Cl. .................. 318/473; 318/380; 388/903; 388/934

(58) Field of Classification Search ........ 318/375–380, 318/471–473; 388/903, 934
See application file for complete search history.

(56) References Cited

U.S. PATENT DOCUMENTS

| | | | | |
|---|---|---|---|---|
| 3,794,898 | A | * | 2/1974 | Gross ........................ 318/380 |
| 4,039,914 | A | * | 8/1977 | Steigerwald et al. ........ 318/375 |
| 4,453,114 | A | * | 6/1984 | Nordlund ..................... 318/376 |
| 5,814,954 | A | * | 9/1998 | Suzuki et al. ................ 318/376 |
| 6,081,086 | A | * | 6/2000 | Roth-Stielow et al. ...... 318/375 |
| 6,577,483 | B1 | | 6/2003 | Steicher et al. |
| 6,956,751 | B2 | * | 10/2005 | Youm et al. ................... 363/37 |

* cited by examiner

*Primary Examiner*—Bentsu Ro
(74) *Attorney, Agent, or Firm*—Quarles & Brady LLP; Alexander R. Kuszewski

(57) ABSTRACT

An apparatus for the thermal regulation of an AC drive for providing power to a motor includes a temperature sensor producing a signal indicative of temperature, a heater resistor connectable across a DC link of the AC drive, and a first switch. A controller is operable to monitor the temperature signal and control the first switch to provide power via the DC link to the heater resistor if the sensed temperature is below a predetermined setpoint.

6 Claims, 1 Drawing Sheet

THERMAL REGULATION OF AC DRIVE

CROSS-REFERENCE TO RELATED APPLICATIONS

Not applicable.

STATEMENT REGARDING FEDERALLY SPONSORED RESEARCH

Not applicable.

FIELD OF THE INVENTION

The present invention relates generally to the thermal regulation of an AC drive.

BACKGROUND OF THE INVENTION

AC drives and variable frequency drives are both terms used to refer to equipment designed to provide variable frequency power to an AC motor. Typically, components of an AC drive include a rectifier and an inverter. The rectifier operates to rectify constant frequency AC power to produce DC power across two lines, known as a DC link, which connect the rectifier and the inverter. The inverter operates to invert the DC power to produce variable frequency AC power that is used to power the AC motor.

The rectifier is commonly constructed using diodes or controllable solid-state semiconductor based switching devices such as silicon-controlled rectifiers (SCRs), gate turn-off thyristors (GTOs), gate-commutated thyristors (GCTs), and/or insulated gate bipolar transistors (IGBTs). To rectify three phase AC power, typically six controllable switching devices are selectively controlled via pulse width modulation or the like.

To control a three-phase AC motor, the inverter also typically includes six controllable switching devices to link the DC power to the motor. By switching these inverter switches on and off, the three phases of the motor are linked to the positive and negative lines of the DC link in a controlled fashion such that variable frequency power is delivered to the motor.

When a motor driven by an AC drive is rapidly decelerated, power may be regenerated and directed back to the DC link. The regenerated energy is normally consumed by mechanical losses and by the motor, but excess energy can also be stored in a bus capacitor connected across the DC link. Many AC drives include means to monitor the voltage across the DC link, and when this voltage exceeds a predetermined value, a power resistor is used to dissipate the excess energy. Typically, this power resistor is in series with a switch across the DC link and the switch is closed when excess energy needs to be dissipated. The switch may be provided as a built-in so-called seventh transistor of the inverter or may be an added component. Similarly, the power resistor may be provided as a built-in component of the AC drive or may be an added component.

BRIEF SUMMARY OF THE INVENTION

AC drives are used in a variety of applications under a variety of environmental conditions and may be subjected to cold temperatures. Thermal regulation of the AC drive when subjected to cold temperatures may be necessary in order to prevent condensation of moisture in the air or to ensure that the components of the AC drive are maintained within an operational temperature range.

In accordance with one aspect of the invention, an apparatus for the thermal regulation of an AC drive for providing power to a motor includes a temperature sensor producing a signal indicative of temperature, a heater resistor connectable across a DC link of the AC drive, and a first switch. The controller is operable to monitor the temperature signal and control the first switch to provide power via the DC link to the heater resistor if the sensed temperature is below a predetermined setpoint. For example, the switch and the heater resistor can be connected in series across the DC link. The heater resistor acts as a heat source when power is provided to it and the apparatus is a simple and cost effective way for providing heat to an AC drive.

In accordance with another aspect of the invention, in one embodiment, the heater resistor also functions as a dynamic brake resistor. In another embodiment, a separate dynamic brake resistor is provided. Various ways of connecting the dynamic brake resistor and/or the heater resistor are provided to control each independently or allow only one of the resistors to be switched across the DC link at one time.

Various other features of the present invention will be made apparent from the following detailed description and the drawings.

DETAILED DESCRIPTION OF THE INVENTION

Figure 1:
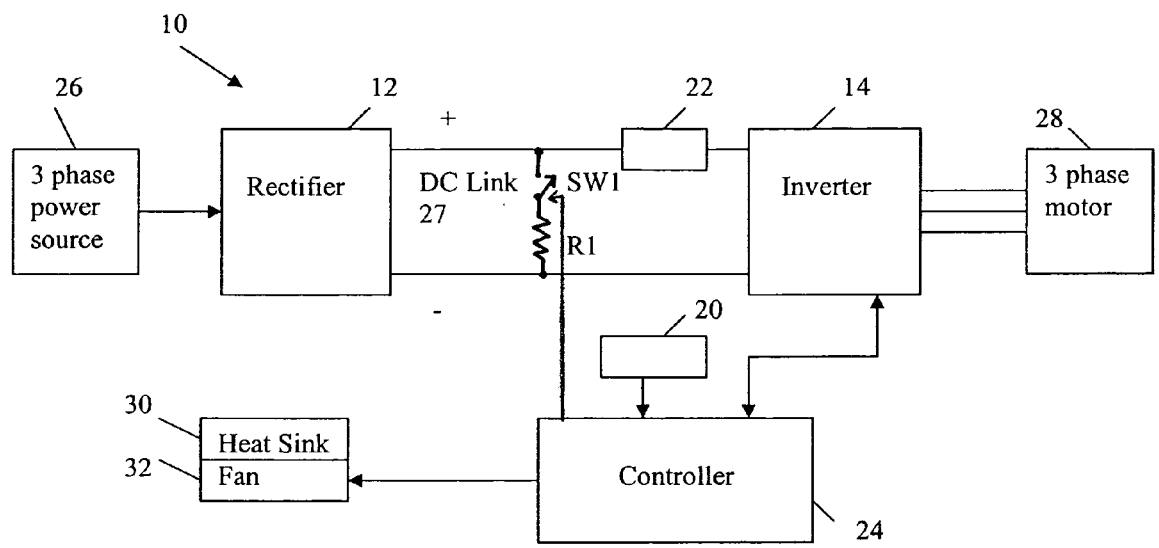
FIG. 1 is a block diagram of an apparatus for the thermal regulation of an AC drive.

FIG. 1 illustrates one embodiment of an apparatus 10 for the thermal regulation of an AC drive. The AC drive includes a rectifier 12, an inverter 14, a switch SW1, a heater resistor R1, a temperature sensor 20, a voltage sensor 22, and a controller 24. The AC drive may include an enclosure (not shown) such as a NEMA-4 rated enclosure.

The rectifier 12 operates to rectify AC power from a constant frequency power source such as a three-phase power source 26 to produce a DC voltage across a DC link 27. The rectifier 12 may be constructed using diodes or controllable solid-state semiconductor based switching devices such as SCRs, GTOs, GCTs, and/or IGBTs. For example, to rectify three-phase AC power, six controllable switching devices are selectively controlled via pulse width modulation or the like. The inverter 12 operates to invert the DC voltage to produce variable frequency AC power that is used to power an AC motor such as three-phase motor 28 and may include six controllable switching devices (not shown) to link the DC power to the motor 28 with an additional seventh controllable switching device. By switching these inverter switches on and off, the three phases of the motor are linked to the positive and negative lines of the DC link 27 in a controlled fashion such that variable frequency power can be delivered to the motor.

The heater resistor R1 is connectable across the DC link 27. As shown in FIG. 1, the switch SW1 is in series with the heater resistor R1 across the DC link 27. The temperature sensor 20 produces a signal indicative of the temperature near the components of the AC drive 10. The voltage sensor 22 produces a signal indicative of the voltage across the DC link 27. The controller 24 controls the operation of the switch to provide power via the DC link 27 to the heater resistor R1 as described below. The controller 24 also controls the operation of the inverter 14 in a known manner to control the motor 28.

In this embodiment, the switch SW1 is normally open and is closed at certain times depending on operating conditions. The heater resistor R1 also functions as a dynamic brake resistor for dissipating energy upon braking of the motor. Thus, the switch SW1 is controlled to either provide energy dissipation for dynamic braking or to provide thermal regulation of the AC drive components within the enclosure. In particular, when the motor 28 is running and dynamic braking is required, the controller 24 monitors the voltage signal across the DC link 27, determines if it exceeds a predetermined value, and if so, sends a signal to close the switch SW1 so that current through the heater resistor R1 operates to dissipate excess energy. When the motor 28 is inactive, i.e., no run or start commands are provided by the controller 24, the controller 24 monitors the temperature signal from the temperature sensor 20, determines if the temperature is below a first predetermined setpoint, and if so, sends a signal to close the switch SW1 so the heater resistor R1 is connected across the DC link 27 and the heater resistor R1 acts as a heat source due to current flowing through it. The heat provided by current flowing through the heater resistor R1 can prevent condensation from forming inside the enclosure and ensure that components of the AC drive 10 inside the enclosure are kept within an operational temperature range. The controller 24 further determines if the temperature then rises above a second predetermined setpoint (which can be the same or different than the first predetermined setpoint), and if so, sends a signal to open the switch SW1.

In this manner, the AC drive 10 can be mounted in a low temperature environment, and left in an idle state, i.e., where the AC drive 10 is powered up but the motor 28 is inactive, and the controlled current through the heater resistor R1 when necessary operates to maintain the components of the AC drive within an operable temperature range.

This embodiment can be implemented on an existing AC drive using components typically already provided simply by providing enhancements to implement the desired operation of the controller 24. In such a case, the switch SW1 could be a relay or another controllable switching device such as the seventh transistor of the inverter 12. The temperature sensor 20 may already be present on an existing drive to sense a temperature within the enclosure. However, it is also simple to provide a separate temperature sensor if needed by coupling it to the controller 24 through a 0-10 V analog input, for example.

One disadvantage to having the same resistor function as both a dynamic brake resistor and a heater resistor is that a dynamic brake resistor is generally located on an exterior surface of the AC drive enclosure and any generated heat from this resistor would need to be coupled back to the components within the enclosure. This coupling can occur by way of a heat sink 30 commonly associated with an AC drive. In normal operation of the heat sink 30, i.e., when removing heat from the enclosure, a heat sink fan 32 is typically turned on. Thus, when it is desirable to instead provide heat to components within the enclosure using the heater resistor R1, the controller 24 would operate to control the heat sink fan 32 to ensure that it remains off, and in this manner the heat sink 30 can operate to transfer heat from an externally mounted resistor to the interior of the AC drive 10.

Figure 2:
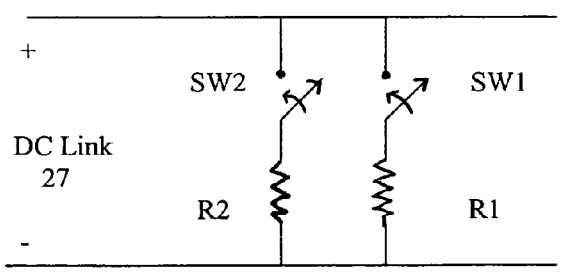
FIG. 2 is an arrangement of a heater resistor, a dynamic brake resistor, and associated control switches.

It is also possible that a separate resistor function as the dynamic brake resistor such that the heater resistor R1 can instead be located within the enclosure of the AC drive 10 and directly provide heat to components within the enclosure. For example, as shown in FIG. 2, switch SW1 and heater resistor R1 are in series across the DC link 27 and a dynamic brake resistor R2 is in series with a second switch SW2 across the DC link 27. Switch SW2 is also under control of the controller 24 and the controller 24 is thus operable to control each of the switches SW1, SW2 independently in order to independently control dynamic braking and heat regulation. For example, when the motor 28 is running and dynamic braking is required, the controller 24 monitors the voltage signal across the DC link 27, determines if it exceeds a predetermined value, and if so, sends a signal to close the switch SW2 so that current through the dynamic braking resistor R2 operates to dissipate excess energy. Independently thereof, the controller 24 also monitors the temperature signal from the temperature sensor 20, determines if the temperature is below a predetermined setpoint, and if so, sends a signal to close the switch SW1 so the heater resistor R1 is connected across the DC link 27 and the heater resistor R1 acts as a heat source due to current flowing through it. The controller 24 further determines if the temperature then rises above a second predetermined setpoint (which can be the same or different than the first predetermined setpoint), and if so, sends a signal to open the switch SW1.

Figure 3:
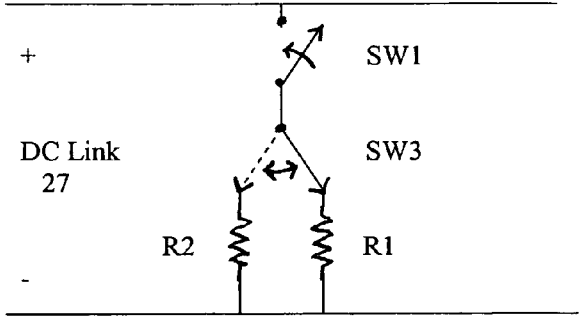
FIG. 3 is another arrangement of a heater resistor, a dynamic brake resistor, and associated control switches.

Another arrangement using a separate dynamic brake resistor R2 is illustrated in FIG. 3. In this arrangement, the controller 24 again controls the opening and closing of both switches SW1 and SW3. Switch SW3 is operable to switch between connecting either heater resistor R1 or dynamic brake resistor R2 in series with SW1 across the DC link 27. When thermal regulation is desired (i.e., when the temperature is below a predetermined setpoint) switch SW3 is controlled to a first position wherein the dynamic brake resistor R2 is disconnected from SW1 and the heater resistor R1 is connected to switch SW1. When dynamic braking is required, switch SW3 is controlled to a second position wherein the heater resistor R1 is disconnected from SW1 and the dynamic brake resistor is connected to switch SW1. This allows switch SW1, which can be a transistor of the inverter, to control both the externally located dynamic brake resistor R2 and the internally located heater resistor R1, although only one could be provided with power at a single time via switch SW3.

The present invention has been described in terms of the preferred embodiments, and it should be appreciated that many equivalents, alternatives, variations, and modifications, aside from those expressly stated, are possible and within the scope of the invention. Therefore, the invention should not be limited to a particular described embodiment.

We claim:

1. An AC drive for providing power to a motor, comprising:

an enclosure, a temperature sensor for measuring temperature within the enclosure, a heater resistor within the enclosure, a rectifier for rectifying AC power and producing DC power on a DC link, an inverter connected to the rectifier across the DC link and converting DC power to adjustable frequency power, a capacitor across the DC link, a switch in series with the resistor across the DC link, and a controller operable to monitor the temperature and voltage across the DC link and control the switch to provide power to the resistor if the motor is inactive and the sensed temperature is below a predetermined setpoint.

2. The apparatus of claim 1 further including a separate dynamic brake resistor for dissipating energy upon braking of the motor and a second switch in series with the dynamic brake resistor and connected across the DC link, and wherein the controller independently controls both switches.

3. The apparatus of claim 1 further including a separate dynamic brake resistor for dissipating energy upon braking of the motor and a second switch under the control of the controller for selectively coupling either resistor in series with the first switch.

4. The apparatus of claim 1 wherein the switch is a transistor of the inverter.

5. The apparatus of claim 1 wherein the switch is a controllable switching device selected from the group including a relay, an SCR, a GTO, a GCT and an IGBT.

6. The apparatus of claim 1 further including a heat sink fan that remains off when the sensed temperature is below the predetermined setpoint and power is provided to the heater resistor.

* * * * *